United States Patent [19]

Cloeren

[11] 4,197,069

[45] Apr. 8, 1980

[54] VARIABLE THICKNESS EXTRUSION DIE

[76] Inventor: Peter Cloeren, P.O. Box 583, Orange, Tex. 77360

[21] Appl. No.: 945,787

[22] Filed: Sep. 25, 1978

Related U.S. Application Data

[60] Division of Ser. No. 782,026, Mar. 28, 1977, Pat. No. 4,152,387, which is a continuation-in-part of Ser. No. 688,937, May 21, 1976, abandoned.

[51] Int. Cl.² .......................... B29F 3/12; B29F 3/06
[52] U.S. Cl. ........................... 425/131.1; 425/133.5; 425/462; 425/465
[58] Field of Search ...................... 264/171; 425/131.1, 425/466, 462, 133.5

[56] References Cited

U.S. PATENT DOCUMENTS

| | | | |
|---|---|---|---|
| 2,052,695 | 9/1936 | Chiverton | 425/131.1 |
| 2,761,417 | 9/1956 | Russell et al. | 425/131.1 |
| 3,125,620 | 3/1964 | Skianev | 425/131.1 |
| 3,151,356 | 10/1964 | Senecal | 425/131.1 |
| 3,464,087 | 9/1969 | Koch | 425/131.1 |
| 3,559,239 | 2/1971 | Work et al. | 425/131.1 |
| 3,743,143 | 7/1973 | Barney et al. | 425/131.1 |
| 3,761,211 | 9/1973 | Parkinson | 425/131.1 |
| 3,849,045 | 11/1974 | Ohkawa et al. | 425/131.1 |

FOREIGN PATENT DOCUMENTS

1389751  4/1975  United Kingdom ..................... 425/130

*Primary Examiner*—Jay H. Woo
*Attorney, Agent, or Firm*—Lowe, King, Price & Becker

[57] ABSTRACT

An extrusion method for the formation of multi-layer laminates of thermoplastic materials comprising introducing melts of thermoplastic materials into separate feed channels and then into back pressure cavities of greater cross-section than the feed channels where transverse flow occurs under conditions of heat and pressure so as to stress-relief the molten thermoplastic materials, release strain therein and provide equal pressure distribution, passing the resulting thermoplastic materials into elongated flow restriction channels of smaller cross section then the back pressure cavities with the material exerting equal pressures along the length of the elongated flow restriction channel and converging the materials into a melt laminate at the exit end of the flow restriction channels. Also provided is an apparatus for conducting the method.

10 Claims, 5 Drawing Figures

VARIABLE THICKNESS EXTRUSION DIE

REFERENCE TO RELATED APPLICATIONS

This is a division of application Ser. No. 782,026 filed Mar. 28, 1977, now U.S. Pat. No. 4,152,387 which is a Continuation-in-Part of Ser. No. 688,937, filed May 21, 1976, now abandoned.

BACKGROUND OF THE INVENTION

Field of the Invention

This invention relates to methods and apparatus for the formation of multi-layer laminates of thermoplastic materials in an extrusion system to form diverse thermoplastic materials into multiple layers of desired thicknesses, and more particularly to an infinitely adjustable extrusion die or adaptor for a die for the extrusion of thermoplastics over a wide range of relative thicknesses and viscosities.

Background of the Prior Art

This invention is concerned with the art of variable area orifices or nozzles utilized with plastic extruders for the manufacture of plastic sheet or film. It is known in the art that many advantages are achieved by the production of multi-layer film constructions of thermoplastics as these materials enable a combination of properties not presently obtained in a layered structure. Originally such products were prepared principally by laminating separately formed films or sheets together by adhesives, heat or pressure. More recently however, techniques were developed for melt laminating, that is two or more diverse thermoplastic materials from separate molten layers converge and join under pressure within the die to emerge as a single laminated material. Such processes make use of the laminar flow principle which enables the two or more molten layers to join in a common flow channel without intermixing thereof at the contacting interfaces under proper operating conditions.

The present invention therefore is concerned with so-called multiple layer extrusion systems which has come into recent prominent use as they provide a convenient way of melt lamination, co-extrusion coating and the like, but more particularly provide for formation of multiple layers of similar or dissimilar thermoplastic materials. This invention is more particularly concerned with so called multi-manifold die systems. In general, such dies or adaptors are designed with an individual flow channel/manifold for each layer and normally the layers are brought into contact just above the exit slot of the die. Typically, each manifold is provided with an adjustable flow restricter means to permit adjustment of flow uniformity of the individual layers. The manifold may be of constant or variable cross section depending on individual requirements and design preferences. Because the layers are joined only near the final exit slot, materials with somewhat diverse rheological properties can be processed but adjustment of the flow restriction means is necessary to minimize individual layer flow nonuniformity and obtain a uniform flow just prior to joining. Any tendency toward actual motion flow at the junction point will cause nonuniformity in the product.

Many devices are known to the art and disclosed in prior patents for the production of laminated films of this type. Much of the prior art is concerned with the use of so-called metering blocks wherein each orifice is controlled by a separate metering block. The metering blocks are adjusted by tension or draw-in bolts or compression bolts with the thread on the shank of such tension or draw-in bolt or compression bolt being a motion thread. Guidance of the metering block is generally affected by means of a groove. Patents disclosing this type of extrusion apparatus are for example U.S. Pat. Nos. 3,464,087; 3,694,119; 3,813,204; 3,877,857 as well as U.S. Pat. No. 3,218,971.

Another group of prior art devices of this type make use of one or more mandrels within the die wherein the mandrel is positioned at the mouth of the die cavity and is movable in order to adjust the width of the die cavity and thereby adjust the thickness of the thermoplastic material being extruded. Patents which disclose apparatus of this type include U.S. Pat. Nos. 2,780,835; 3,453,690 and U.S. Pat. No. 3,559,239. A patent showing a similar apparatus is U.S. Pat. No. 3,464,087 which makes use of a wedge which moves toward or away from the entrance to the extrusion channel. Still a further device is disclosed in U.S. Pat. No. 3,390,432 to Becker which provides an eccentric means mounted in the body of the die and extending into a slot in the metering block whereby the position of the metering block in the body can be determined by movement of the eccentric means.

In all of these prior art devices however, there is no provision by which infinite adjustment of two, three or more extrusion passages can have their relative dimensions varied so as to provide multi-layer thermoplastic material laminate wherein each of the layers can be a thickness different from any of the other layers.

One prior patent which is concerned with this type problem is U.S. Pat. No. 3,761,211 to Parkinson which discloses an extrusion apparatus die for producing laminated film which includes a die block having a die passage leading to a pair of die lips through which thermoplastic materials can be extruded. The apparatus comprises an adaptor connected to the die block and having a main channel connected to the die passage, feed channels which converge into the main channel and valving means located at the point of convergence of the feed channels for controlling the relative flow of thermoplastic materials from the feed channels into the main channels. With this system however, it is not possible to control the rate of introduction and combination of melt extrudates of differing viscosity and flow rate. Accordingly, problems are encountered in this system in failing to obtain a uniform laminate at the convergence point.

The present invention provides a method and extrusion system for the formation of multi-layer laminates of diverse thermoplastic materials to obtain uniform lamination.

SUMMARY OF THE INVENTION

It is accordingly one object of this invention to provide an extrusion apparatus for the formation of multi-layer thermoplastic constructions.

It is a further object of the present invention to provide an improved extrusion die for the simultaneous extrusion of multi-layers of diverse thermoplastic materials wherein the flow passages at the point of intersection in the die can be infinitely adjusted to provide a laminated product having layers of different thicknesses.

A still further object of the invention is to provide an improved extrusion die for the simultaneous extrusion of multi-layers of thermoplastic materials of different thicknesses, flow rates and viscosities wherein the adjustments of the metering channels determining the layer distribution in cross-flow direction are adjustable exteriorly of the die.

Other objects and advantages of the present invention will become apparent as the description thereof proceeds.

In satisfaction of the foregoing objects and advantages, there is provided by this invention an improved extrusion system for forming laminated extrudable thermoplastic materials in multiple layers of varying thicknesses. The method comprises:

(1) introducing melts of thermoplastic material into separate feed or flow channels;

(2) passing said melts through said channels to back pressure cavities of greater cross-section than said feed or flow channels wherein transverse flow occurs under conditions of heat and pressure to stress-relief the molten thermoplastic material and release strain in said material and provide equal pressure distribution;

(3) passing said stress-relieved thermoplastic material into an elongated flow restriction channel of smaller cross-section than said back pressure cavities, said material exerting equal pressures along the length of the elongated flow restriction channel;

(4) said flow restriction channel establishing a delta pressure on said thermoplastic material which is related to the viscosity of the thermoplastic material in accordance with the following equation:

Shear Stress $= (\Delta P) h / 2L$ wherein $\Delta P$ is the difference between the pressure entering the flow-restriction channel and the pressure exiting the flow-restriction channel, h is the width of said flow-restriction channel, and L is the length of the flow-restriction channel; and (5) converging said materials into a melt-laminate at the exit end of the flow-restriction channels.

Also provided by this invention is an extrusion system for melt-laminating thermoplastic materials into multiple layers of desired thicknesses, the system comprising:

(1) a die body forming an open-ended nozzle, a totally enclosed housing within said body;

(2) feed ports for introduction of thermoplastic materials into multiple flow channels and then into back pressure cavities traversing said housing and converging at a V-shaped opening leading to a die-exit channel at the exit end of said housing;

(3) adjustable flow divider means provided between any two of said flow channels, each of said divider means having a head portion and a point portion, said point portion extending into said V-shaped opening and dividing said flow channels into separate flow-restriction channels of adjustable widths, said flow-restriction channels being of smaller cross-section than the corresponding back pressure cavity;

(4) adjustment means at said head portion of said divider, said adjustment means being adapted to rotate said head portion around its axis to control and define the lateral area through which the point of said divider moves;

(5) the walls of said divider means, alone or together with said housing, forming an elongated cavity between said feed ports and said V-shaped opening, said cavity being of greater cross-section than the corresponding restriction channel;

(6) said flow-restriction channels being defined by the walls of said divider means between said cavity and said V-shaped mouth alone or together with said housing;

(7) the melt streams of thermoplastic material converging in said V-shaped opening and forming a multi-layer melt-laminate just prior to entering said die-exit channel;

(8) whereby the flow velocity is maintained in each flow-restriction channel within generally equal velocities by said divider means, and said flow velocity is in direct relationship to the rate of introduction of thermoplastic materials fed into said feed ports.

BRIEF DESCRIPTION OF THE DRAWINGS

Reference is now made to the drawings accompanying this application wherein.

DESCRIPTION OF THE PREFERRED EMBODIMENTS

This invention relates to a multiple-channel extrusion die which is eminently suitable for the production of thin laminated or multi-layer thermoplastic film or sheets, such as those composed of a plurality of layers of the same or different thermoplastic materials. Thermoplastic materials of this type include low- and high-density polyethylene, polypropylene, polycarbonates, polyamides, polyvinylchloride, polyvinylylidine chloride, polystyrene, polyvinylacetate, polyacrylonitrile, copolymers thereof, and similar thermoplastic resins as well as pressure sensitive adhesive thermoplastic melts. This invention is particularly concerned with an extrusion die apparatus in which the flow rate of each of the individual layers or plies of the extruded thermoplastic material can be readily varied and controlled over an infinite variety of settings within the die block and wherein uniform flow velocities are achieved at the point of convergence.

According to the present invention, it has been found that in order to obtain proper lamination of the multiple layers at the point of convergence or lamination, the flow velocity of the thermoplastic melt in each channel at the point of convergence must be substantially equal; if not, the turbulence which is generated in the melt destroys the preconditions necessary for laminar flow. In the present invention, it has been found that the use of back pressure chambers or cavities disposed as closely as possible to the orifice leading to the flow restriction channels permits the flow restriction channel to generate shear stress and thereby generate heat and also to take advantage of the changes made in the plastic in the back pressure cavities. By this method, the viscosity of the thermoplastic melt may be changed and the flow velocity thereby controlled.

According to the method of the present invention, the multi-layer laminates of thermoplastic materials are formed utilizing an extrusion system wherein melts of thermoplastic materials which have different velocities can be separately introduced into the die. These materials are introduced into the feed channels and passed into back pressure cavities or areas within the die or adaptor, the back pressure cavities being of greater cross-section than the feed channels. In the back pressure cavities, transverse flow occurs under conditions of heat and pressure so as to stress-relief the molten thermoplastic materials and release strain in the materials and equalize the pressure distribution. These back pressure cavities thereby in effect serve to de-memorize the plastic.

From the back pressure cavities the thermoplastic materials are then passed into elongated flow restriction channels which are of smaller cross-section than the back pressure cavities. In the back pressure cavities the thermoplastic material exerts equal pressures along the entire length of the elongated flow restriction channel. It has been found according to the present invention that the flow restriction channel establishes a delta pressure on the thermoplastic material which is related to the viscosity of the thermoplastic material in accordance with the following equation:

Shear Stress = $(\Delta P)h/2L$ wherein $\Delta P$ is the difference between the pressure entering the flow restriction channel and the pressure exiting the flow restriction channel, h is the width of the flow restriction channel, and L is the length of the flow restriction channel. This occurs in each of the flow restriction channels for each layer of material.

At the point of exiting the flow restriction channels, the several layers converge into a melt laminate. The melt laminate is achieved with uniform layering since the materials exiting the flow restriction channels are at the same flow velocity made possible by the control provided by the combination of the flow restriction channel and back pressure cavities.

The main embodiments of the present invention provide extrusion dies or adaptors for extrusion dies in which thermoplastic materials of the type described above can be extruded to form a multi-ply laminate of flat film or sheets so that the resulting product is a multi-ply construction wherein the various layers have thicknesses which can be varied over the entire width of the flow channel opening. In achieving the variations in thickness, the extrusion die apparatus provides an adjustable divider or metering vane blade or wedge-shaped construction which can be adjusted from a position exterior of the die. The pointed portion of the divider extends into the area at which the thermoplastic flows converge and the point of the divider can be moved laterally by applying motion to the head of said divider. In this manner, when one of the metering channels is narrowed the corresponding channel on the other side of the point of the divider is widened. When this concept is applied to a die or adaptor which has three or more channels, a wedge-shaped metering vane blade is provided to divide and control the width of adjacent flow channels.

Figure 1:
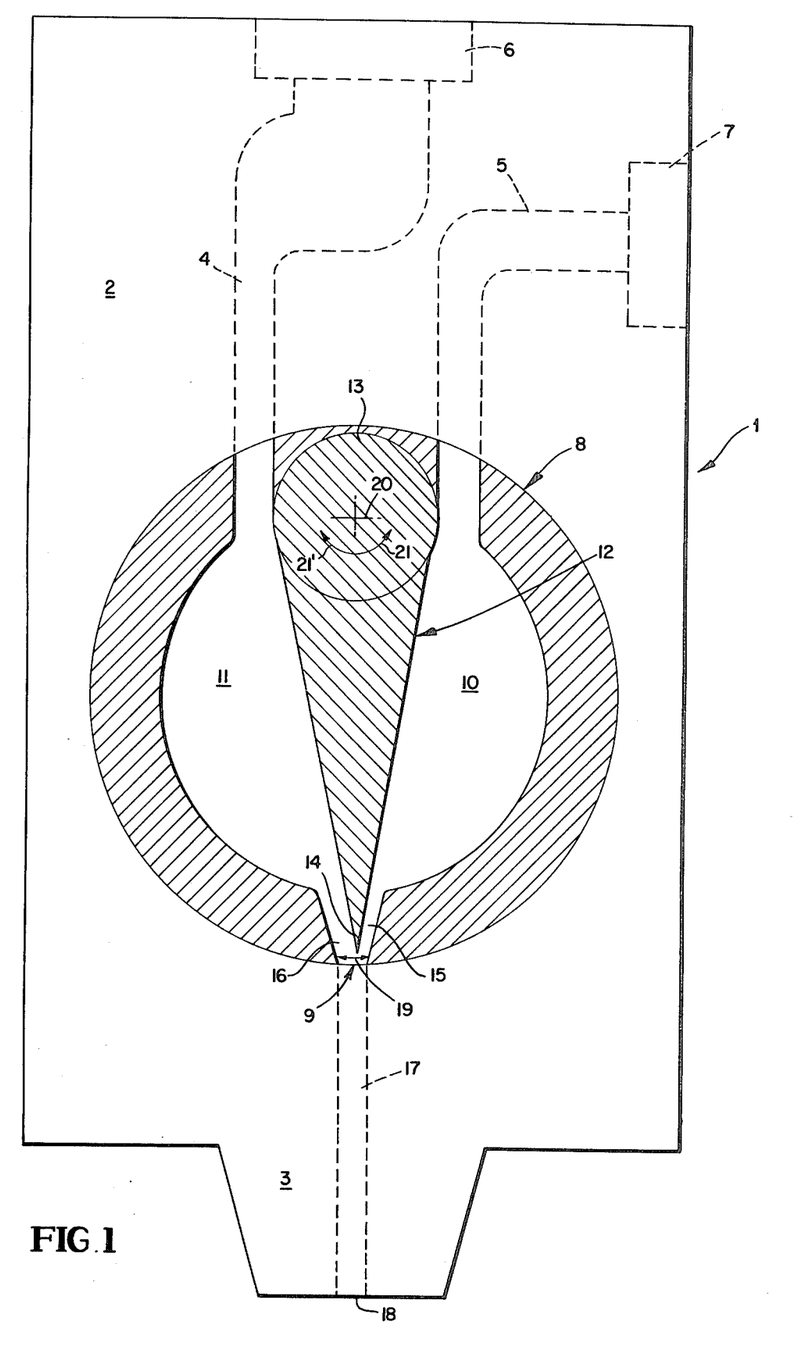
FIG. 1 is a sectional view of an extrusion die means of this invention for the production of a two-ply thermoplastic laminate.

Referring now to the drawings which illustrate the embodiments of the present invention, it will be seen that FIG. 1 shows a sectional view of an extrusion die useful in forming a two-ply laminate according to the invention. In the view of FIG. 1, a die is shown generally at 1 containing a die body 2 and die lips 3. While the construction shown has separate die lips and body, it should be understood that the die lips can be mere extensions of the die. The die shown is a construction which provides for the extrusion of two thermoplastic layers through feed channels 4 and 5, with the thermoplastic being introduced at ports 6 and 7, respectively. The die head is provided with a metering housing 8 through which feed channels 4 and 5 pass to merge at the slot opening 9. The flow channels are generally round holes having a diameter of about ½ inch to 2 inches. Back pressure cavities 10 and 11 are provided within the metering housing to provide means to exert equal pressure on the thermoplastic material as it is extruded as discussed above.

An essential aspect of the present invention is provided by the presence of the adjustable divider or vane blade 12 which is generally of wedge-shaped configuration and has a head portion 13 having adjustable means therein, and a pointed portion 14 which protrudes into the V-shaped opening at slot opening 9 to a point at about the exterior perimeter of the metering housing 8 so as to form flow restriction channels 15 and 16 at the point where these channels merge at the slot opening. It will be understood that the opening of each flow restriction channels 15 and 16 relates to the rate of each particular thermoplastic being extruded through flow channels 4 and 5 so that the resulting laminated product is extruded into the single channel 17 in the die lips 3 and finally exits from the die at 18. The flow restriction channels 15 and 16 in the slot 9 formed by the point portion 14 of the adjustable divider blade 16 are adjustable relative to each other. Thus the point of the blade may be moved through the arc 19 to the desired position. As will be noted, when the divider blade is moved to one side to narrow the restriction channel, the corresponding restriction channel on the other side of the vane blade will be widened. Thus channels 15 and 16 may be widened or narrowed relative to each other without losing the tapered constriction.

Movement of vane blade 12 is effected by means of head portion 13 which is provided with an adjustable portion 20. Adjustable portion 20 is accessible from the outside of the die and can be moved in either of the directions of the arrows 21 and 21' by a wrench or other means from a position exterior of the die head. By movement of the head portion in either of the directions 21 or 21', the point 14 of the vane blade 12 is adjustable to any of the positions of arc 19 and the restriction channels 15 and 16 are thus adjustable through an infinite variety of positions. Accordingly, the thermoplastic exiting flow restriction channels 15 and 16 forms a laminate at slot opening 9 and will have a thickness dictated by the adjusted width of openings 15 and 16.

Figure 2:
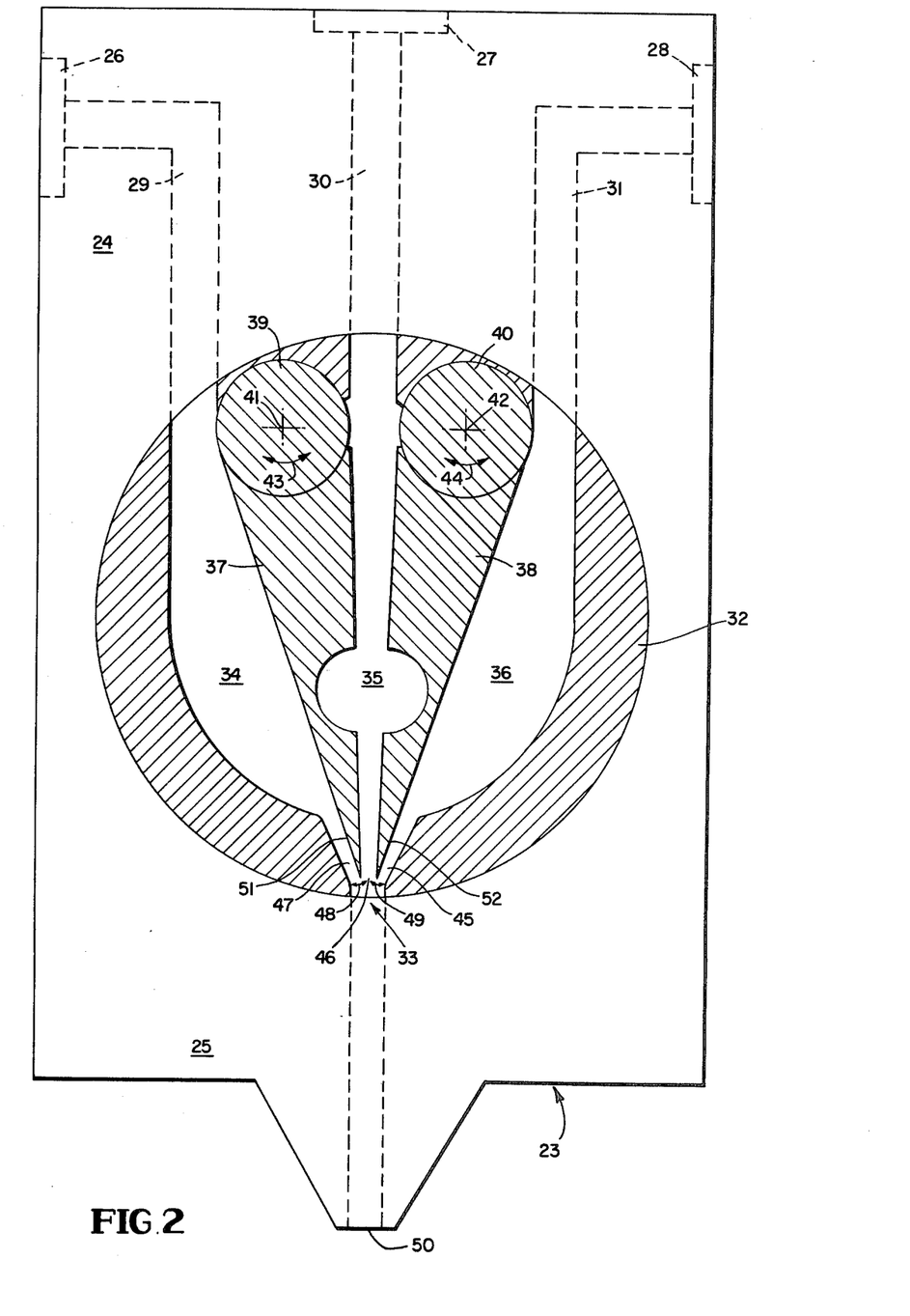
FIG. 2 is a sectional view of a multiple extrusion die head for the extrusion of a three-ply thermoplastic laminate of varying thickness.

Referring now to FIG. 2, it will be seen that a further embodiment of the present invention is shown and in particular, an enlarged sectional view of a die head wherein three channels are converged for the formation of a three-ply laminated product are illustrated.

In the construction of FIG. 2 there is provided as in FIG. 1 a die head 23 having a body 24 and the die lips 25 with thermoplastic input ports 26, 27 and 28. The die body 24 is provided with feed channels 29, 30 and 31, respectively, the feed channels being generally round holes having diameters in the range of ½ inch to 2 inches for thermoplastic introduction. The die head is also provided with a metering housing 32 through which feed channels 29, 30 and 31 pass and converge at the die slot 33, at which point the convergence of the layers resulting from the three feed channels occurs to form the three-ply laminate by laminar flow. Back pressure cavities or chambers 34, 35 and 36 are provided to maintain the necessary pressure on the thermoplastic as described above.

The adjustment of the thickness of each individual layer from the feed channels 29, 30 and 31 is provided by adjustable metering vanes 37 and 38 which are generally of wedge-shaped construction as described for FIG. 1 and have head portions 39 and 40 and point portions 51 and 52, respectively. As described for FIG. 1, the point portions 51 and 52 project into the V-shaped opening 33 and form flow restriction channels 45, 46, and 47 which determine the thickness of the thermoplastic materials passing through the metering channels and thus the thickness of each layer of laminate. Action of the dividers 37 and 38 cause the flow restriction channels 45, 46 and 47 to be slightly tapered toward slot opening 33 to assist in placing back pressure on the system. The adjustable metering vanes are provided at head portions 39 and 40 with adjustable means 41 and 42 such as sockets or nuts which can be turned with a wrench or other means, with egress thereto being by means of a slot in the die head. By this means the head portions 39 and 40 can be turned in an arc or around their axis 43 and 44 to result in turning of the point portions 41 and 42 through either of the arcs 48 and 49. By this means turning of either head portion 39 and 40 will change the width of the flow channels 45, 46 or 47 at slot opening 33 by changing the adjustments of the metering vane points 51 and 52 so that flow restriction channels 45, 46 and 47 can be varied over the complete range of the slot 33. Therefore, in the converging area 33, the opening of the metering slot of each flow channel will be proportional to the inputs of the three extruders as this will insure equal flow velocity at the point of combining the thermoplastic materials. In considering this construction it will be appreciated that one of the slots may be even closed off completely so that with a three channel extruder head as described in FIG. 2, a two-ply laminate could be formed. While the dividers or vane blocks of FIGS. 1 and 2 are shown as being within the die body, they could also be disposed within the lips as this variation is within the scope of the invention.

Figure 3:
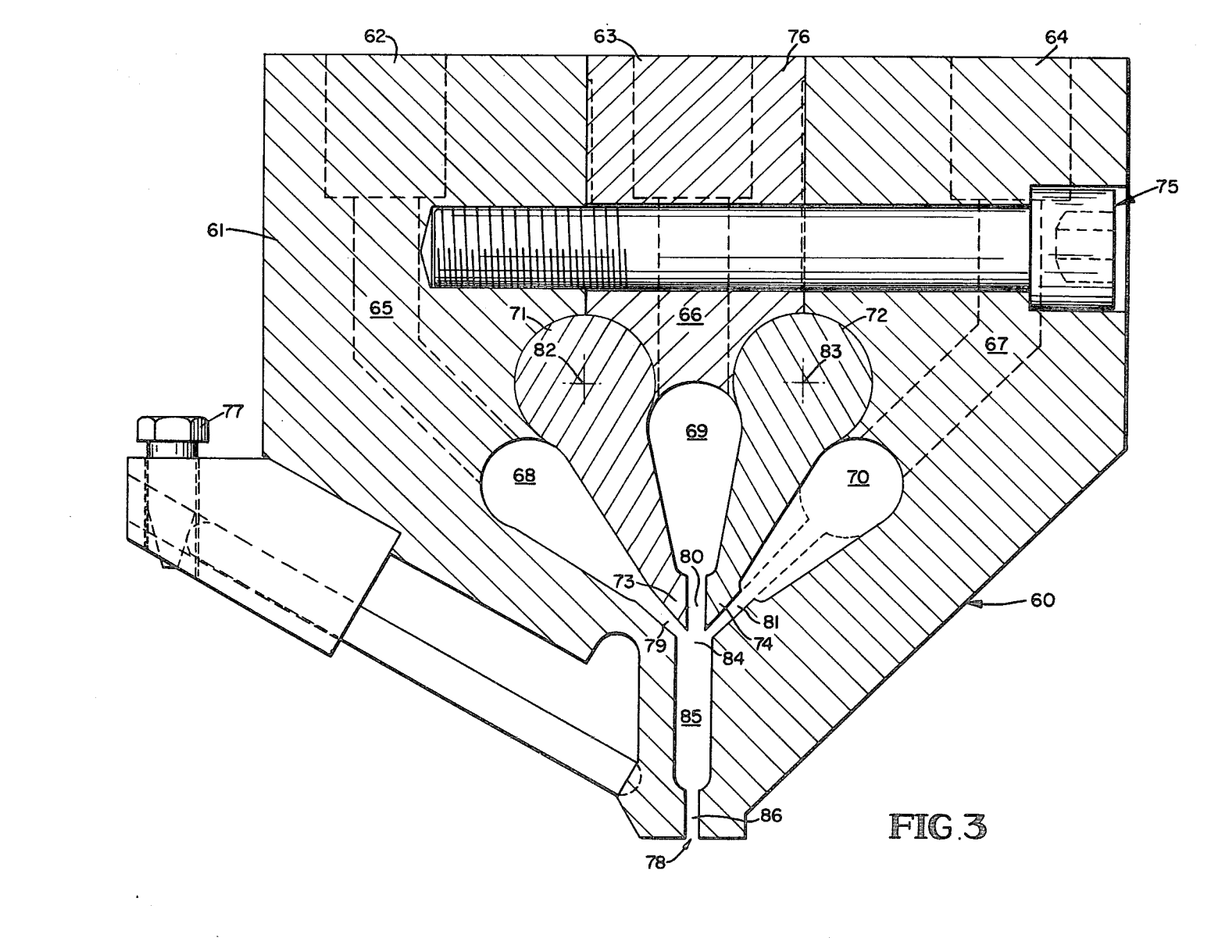
FIG. 3 is a sectional view of a three-layer extrusion die having adjustable flow distribution dividers which can handle melts of differing viscosities.

The embodiment of FIG. 3 represents the most preferred embodiment of the present invention and is a three layer extrusion die-adaptor shown. This embodiment has adjustable flow distribution dividers and no dead spots in the system. The die-adaptor 60 of this Figure comprises a housing 61 into which thermoplastic materials are introduced by ports 62, 63 and 64. The thermoplastic materials may be of differing viscosities when introduced at these ports as described above. The thermoplastic materials then proceed through feed channels 65, 66 and 67 into back pressure cavities 68, 69 and 70. The openings or orifices of the flow restriction channels are regulated by dividers having head portions 71 and 72 and point portions 73 and 74 as shown. The die-adaptor is also provided with a head screw 75 to maintain the components in air-tight relationship by screw connection of the outside blocks of the die with die center block 76. Also, die-gap adjustment bolt 77 is provided to adjust the die-gap or opening 78.

In practice, the thermoplastic materials of the same or differing viscosities are introduced into the ports 62, 63 and 64 and proceed through the feed channels 65, 66 and 67 into back pressure cavities 68, 69 and 70. The flow restriction channels 79, 80 and 81 leading from the back pressure cavities to the converging point are adjusted by movement of the head portions 82 and 83 of the dividers to determine the desired distribution of each layer. From the back pressure cavities the thermoplastic materials pass through the flow restriction channels in accordance with the rheological equation described above and converge to form the laminate at the converging point 84. At this point, the pressures are substantially equal as is the flow velocity and viscosity so that uniform lamination is achieved. In this particular embodiment, a preland area 85 is provided through which the material passes and then into the land area or die lip 86 and finally exiting from the die at 78.

In operation of this and related embodiments, the extruders are each equipped with 200 h.p. d.c. variable speed motors. By adjusting the extruder feed screw speed (RPM), the machine operator can select any desired output of each extruder which is the determining factor in arriving at a desired layer thickness. These features are not shown in the drawings.

In this system, the opening of channels 79, 80 and 81 will be in proper relationship with the rate of thermoplastic materials flowing through the restriction channels being regulated so that each layer is a perfect rectangular sheet. If the channel openings 79, 80 and 81 are outside of the relative flow rates, the product would lose uniform layering characteristics so that some layers would concentrate toward the center of the sheet and the center layer material would be forced to the outside edges. Thus, the dividers alone cannot control the layer thickness.

In a typical operation of the die adaptor of FIG. 3, thermoplastic melt materials are introduced into the input ports 63, 64 and 65 at desired velocities at ambient temperatures. Two sources of energy may be applied to raise the material temperature from ambient to extruder output temperature; (1) the extruder screw generates frictional heat which often is all the heat required, and (2) external heater bands can induce the required heat to arrive at a desired temperature level. The correct temperature in degrees F depends either on the plastic material being processed, or the maximum allowable temperature for any given end-use of the finished product, so there is no fixed typical temperature for operating with diverse thermoplastic materials. The operator may also modify the viscosity at the extruder portion in a given operating condition, but he cannot shift the temperatures to satisfy the viscosity requirements.

The die may also be equipped with a set of chill rolls which have two functions. For example, one function may to be process 1500 pounds per hour of plastic materials which might require 1,000,000 BTU's of heat input. By supplying 1,000,000 BTU's of coolant to the chill rolls, the heat can be removed prior to further processing. The second function is to regulate the surface speed of the chill rolls to "draw" the material leaving the die down to a lesser thickness.

Figure 4:
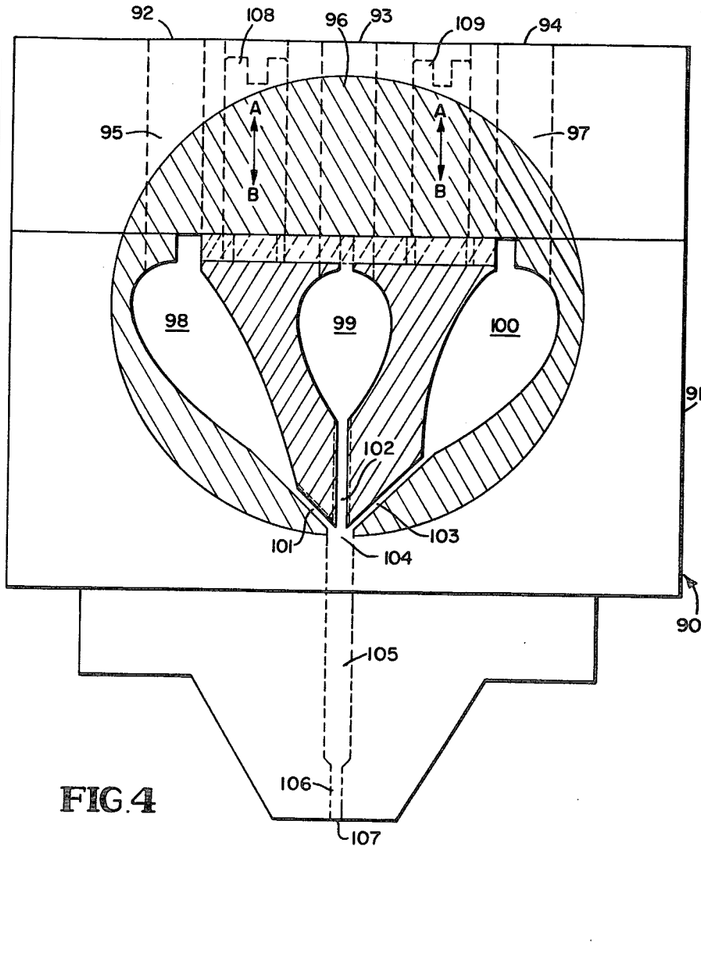
FIG. 4 is a sectional view of a multi-layer extrusion die adaptor wherein adjustment of the thickness of the laminates is achieved by slide means.

In FIG. 4, a multi-layer extrusion die-adaptor is shown which differs from the previous embodiments in that adjustment of the flow passages is made by sliding means. As may be seen in FIG. 4, the die-adaptor 90 comprises a housing 91 having the necessary input ports 92, 93 and 94, feed channels 95, 96 and 97, and back pressure cavities 98, 99 and 100, leading to flow restriction channels 101, 102 and 103, which lead to divergence point 104, and finally through the preland area 105 to the land area 106 and exiting at the die lip 107. These aspects are as described for FIGS. 1, 2 and 3. In this embodiment however, the openings of the flow restriction channels are controlled by slides 108 and 109 which move in the direction of the arrows as indicated. As may be seen from the arrows, when the slides 108 and 109 are moved in the direction B, the flow restriction channesl are decreased. This, therefore, is a different embodiment for regulation of the dimensions of the flow restriction channels and back pressure cavities and provides a different type of divider.

Figure 5:
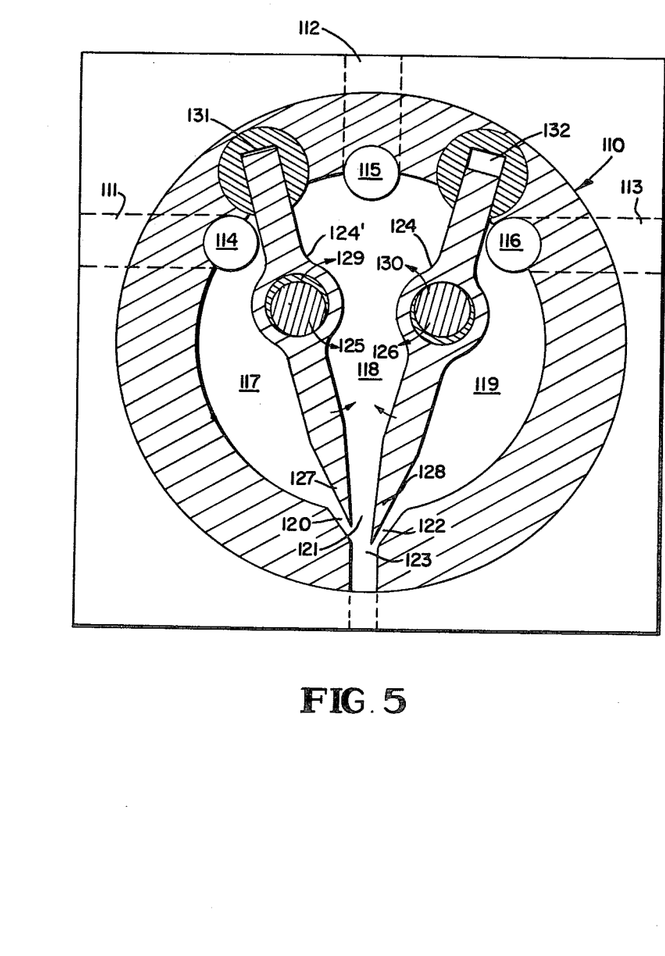
FIG. 5 is a sectional view of a further embodiment comprising an adaptor for multi-layer extrusion wherein longitudinally adjustable dividers are utilized to compensate for various rates of feed.

FIG. 5 represents a still further embodiment of the present invention and provides a longitudinally adjustable multi-layer extrusion die wherein the divider blades compensate for various rates of flow of the thermoplastic materials. As may be seen, this embodiment comprises housing 110 provided with entrance ports 111, 112 and 113 which then lead to flow channels 114, 115 and 116, into back pressure cavities 117, 118 and 119 and then through the flow restriction channels 120, 121 and 122 and finally into the converging point 123. In this embodiment, the divider means comprise longitudinally adjustable vanes 124 and 124' which compensate for various rates of feed and thereby provide a wider range on the rates of material using the same amounts. As may be seen from this embodiment, the divider means comprise head portions 125 and 126 and point portions 127 and 128 extending into the converging point. At the head portion, rotation of the head about its axis is provided by eccentric means or shafts 129 and 130 so that rotation of the head portion about its axis will cause the divider not only to move from side to side but also to move longitudinally and thereby compensate for different rates of feed by angular and linear displacement. As may be seen, spaces 131 and 132 are provided at the top end of the divider so that the eccentric means can cause the divider blade to move into and out of the space. As shown in FIG. 5, divider blade 124 is shown in downward position and divider blade 124' is in the upward position so that the points of the divider blades are not even.

The eccentric extension shafts are turnable from the outside of the die-adaptor. Turning the eccentric shaft will not only cause a change in the width of flow restriction channels 120, 121 and 122, but will also retract the vane blade tip out of the restriction section. Vane blade 124 is adjusted for low flow rate and vane blade 124' for a high flow rate.

The back pressure reservoirs are in fact stress relief chambers for the thermoplastic materials must be de-memorized prior to combining various layers of plastics into one de-memorizing common laminated sheet or film. Regardless of the vane tip position, the thermoplastic materials in each metering channel are being compressed-accelerated inversely proportional to the square area through each restriction channel. There is no expansion of the plastic material as it passes through the restriction channels.

It will be understood from the present invention that the velocity in each flow channel at the point of convergence must be substantially equal; if not, the turbulence generated will destroy the preconditioning necessary for proper laminar flow. The back pressure chambers are necessary to de-memorize the plastic as described. The amount of thermoplastic feed determines the flow rate and the orifice or flow restriction channel must be in the same relationship as the feed to establish the same flow velocity. In order to get good laminar flow in any device of this type, the velocities and the viscosities of each thermoplastic must be substantially equal at the point of convergence or else nonuniform variations will appear in the final laminate.

As pointed out above the die of this invention provides for the formation of laminated sheets or films of two, three, four, five or more plies, which will have thicknesses which can range over the complete width of the metering vane. For additional laminates, the simple addition of a divider or vane blade will provide the possibility of one or two additional flow channels of adjustable widths. For most extrusion dies, the convergence point which defines the width of the die slot, will generally range from about 0.01 inch to 1.0 inch. The adjustments made by the metering vane will vary from about 0 to 100% of the complete opening.

It should be understood that the present invention is concerned with a laminar flow adaptor and not merely an extrusion die. In this invention, it is proper to refer to the apparatus as a die-adaptor in that it can function either as a die or as an adaptor. The multi-layer adaptor depends substantially on the nonturbulent flow of the various streams of thermoplastic materials and when operating with diverse thermoplastic materials at different operating temperatures, there will be differences in their viscosity. By the system of the present invention it is possible to bring the viscosity of the multi-streams of thermoplastic materials into equalization prior to forming the laminate and also reduce turbulence in the stream so that the resulting laminate can follow the laws of laminar flow. It has been found that if turbulence exists and the viscosity is unequal, the ratio of utilization of diverse thermoplastic materials will be greatly reduced. The present system will cover a viscosity ratio of materials of greater than 30:1 as they are introduced into the system so that the system will provide for pressure velocity compensation. Therefore, it is to be understood that an important aspect of the present invention is the ability of the apparatus and the method to equalize the viscosity of these streams at the point of convergence.

The following Examples are presented to illustrate the invention but is not to be considered as limited thereto.

EXAMPLE I

In a specific embodiment of the present invention a construction of FIG. 3 is utilized for the formation of a 3-ply laminate. High density polyethylene melt at 510° F., and relative melt flow of 1.0, is fed into the supply channel 67 at a rate of 150 lbs./hr. while simultaneously low density polyethylene melt at a temperature of 420° F., and relative melt flow of 6.0, is fed into supply channel 66 at a rate of 1050 lbs./hr. An extrudable pressure sensitive thermoplastic adhesive, melt temperature 210° F., relative melt of 30.0, is fed into supply channel 65 at a rate of 300 lbs./hr. Each of these materials passes through the back pressure chambers 70, 69 and 68 and flow restriction channels 81, 80 and 79. The total rate of materials fed into supply channels 67, 66 and 65, is 1500 lbs./hr. Percentage wise, the input of high density material equals 10%, the input of low density material equals 70%, and the input of pressure sensitive adhesive equals 20%. Therefore, the opening of restriction channel 81 equals 10% of the V-shaped opening 84; restriction channel 80 equals 70% of V-shaped opening 84; and restriction channel 79 equals 20% of V-shaped opening 84. The uniformly laminated 3-ply material is recovered at die lip 86.

EXAMPLE II

In a further specific embodiment of the present invention, the construction of FIG. 3 is utilized for the formation of a 2-ply structure. Nylon thermoplastic melt at 490° F., relative melt of 0.5, is fed into supply channel 67 at a rate of 1080 lbs./hrs. while simultaneously, polypropylene thermoplastic melt at a temperature of 400° F., relative melt 4.0, is fed into supply channel 65 at a rate of 1350 lbs./hr. Each of these materials passes through the back pressure chambers and flow restriction channels and converge at the V-shaped opening 84 to form the laminate as described for Example I.

Since nylon and polypropylene are non-compatible materials, extremely thin layers of nylon and polypropylene can be produced. After extrusion, the materials separate and can be rewound on separate mandrels, or an extrudable thermoplastic adhesive, temperature 410° F., relative melt 5.0, can be fed into supply channel 66 at a rate of 270 lbs./hr. for binding the nylon and polypropylene structures. The total rate of materials fed into supply channels 67, 66 and 65 are 2700 lbs./hr. The input of nylon is 40%, polypropylene is 50% and the adhesive 10%. Therefore, the opening of restriction channel 81 equals 40%, channel 79 equals 50% and channel 80 equals 10% of the total opening.

From this we learn that the layer thickness is directly related to the rate of materials fed into the separate feed channels. At the point of convergence in the V-shaped opening 84, the flow stream is in the magnitude of 0.375 inches, more or less. The flow stream dimension is first reduced by the die land opening 86, for example 0.010 inch. The two or the three layer structure of the molten sheet can be further reduced by drawdown.

It can be readily seen that by this process of multilayer melt laminations, one single layer might be 0.00005 inches thick while the other two layers are 0.001 inches thick.

The invention has been described herein with reference to certain preferred embodiments. However, as it is obvious that variations thereon will become apparent to those skilled in the art, the invention is not to be considered as limited thereto.

What is claimed is:

1. An extrusion apparatus for melt-laminating thermoplastic materials into multiple layers of desired thicknesses, said apparatus comprising:
   (1) a die body forming an open-ended nozzle;
   (2) a totally enclosed housing within said body;
   (3) feed ports for introduction of thermoplastic materials into multiple flow channels, said flow channels traversing said housing and converging in a V-shaped opening leading to a die-exit channel at the exit end of said housing;
   (4) adjustable divider means provided between any two of said flow channels, each of said divider means having a head portion and a point portion, said point portion extending into said V-shaped opening;
   (5) adjustment means on said divider means, said adjustment means adapted to cause said head portion to move longitudinally or rotate around its axis to control and define the lateral area through which the point of said divider moves;
   (6) the walls of said divider means, alone or together with said housing, forming in each of said flow channels, an arcuate, elongated back pressure cavity between said feed ports and said V-shaped opening, said cavity being of greater cross-section than the remainder of the corresponding flow channel; and
   (7) the walls of said divider means, alone or together with the walls of said V-shaped opening, forming in each of said flow channels, a tapered flow-restriction channel between said back pressure cavity and said die-exit channel; said flow-restriction channel terminating at the point of convergence of thermoplastic streams flowing through said flow channels, and said flow-restriction channel being of smaller cross-section than the corresponding back pressure cavity; and the width of said flow-restriction channel being adjusted by said adjustment means;

whereby manipulation of said adjustment means adjusts flow-restriction channel width so as to induce sheer stress and cause the materials to converge at substantially equal velocities and viscosities in said V-shaped opening.

2. An apparatus according to claim 1 wherein said adjustable divider means is adjustable by rotating the head portion of said divider means about its axis.

3. An apparatus according to claim 1 wherein said longitudinal movement is provided by eccentric means around which the head of said divider means is rotated which causes at least one of said point portions to extend further into said V-shaped opening than another of said point portions.

4. An apparatus according to claim 1 wherein said adjustable divider is adjustable by sliding said divider means longitudinally.

5. An apparatus according to claim 1 wherein the die nozzle opening ranges from 0.001 inch to 1.00 inch.

6. An extrusion apparatus according to claim 1 wherein the adjustment at the V-shaped opening ranges from 1 to 100% of the opening.

7. An apparatus according to claim 1 wherein the extrusion apparatus has two flow channels and a single adustable divider blade.

8. An apparatus according to claim 1 wherein the extrusion apparatus has three flow channels and at least two adjustable divider blades.

9. An apparatus according to claim 1 wherein the extrusion apparatus has more than three flow channels.

10. An apparatus according to claim 1 wherein said adjustable means at said head portion is adjustable at a point exteriorly of the die body.

* * * * *